(12) United States Patent
Loubinoux et al.

(10) Patent No.: US 6,294,036 B1
(45) Date of Patent: Sep. 25, 2001

(54) METHOD AND DEVICE FOR MAKING COMPOSITE SHEETS

(75) Inventors: Dominique Loubinoux, La Terrasse; Jacques Voiron, Saint-Jean de Couz; Jean-Paul Debalme, Chambery; Charles Saint-John, La Morre Servolex, all of (FR)

(73) Assignee: Vetrotex France, Chambery (FR)

( * ) Notice: Subject to any disclaimer, the term of this patent is extended or adjusted under 35 U.S.C. 154(b) by 0 days.

(21) Appl. No.: 09/147,038

(22) PCT Filed: Jan. 14, 1998

(86) PCT No.: PCT/FR98/00067

§ 371 Date: Sep. 15, 1999

§ 102(e) Date: Sep. 15, 1999

(87) PCT Pub. No.: WO98/31857

PCT Pub. Date: Jul. 23, 1997

(30) Foreign Application Priority Data

Jan. 16, 1997 (FR) .................................................. 97 00387

(51) Int. Cl.[7] .................................................... D01D 5/08
(52) U.S. Cl. ........................ 156/181; 156/166; 156/176; 156/180; 442/327; 442/341; 442/344; 425/112; 264/165; 264/172.11; 264/175

(58) Field of Search ..................................... 156/166, 176, 156/180, 181; 442/327, 341, 344; 425/112; 264/165, 172.11, 175

(56) References Cited

U.S. PATENT DOCUMENTS 5,364,686 * 11/1994 Disselbeck et al. ................. 428/174

* cited by examiner

*Primary Examiner*—Richard Weisberger
(74) *Attorney, Agent, or Firm*—Oblon, Spivak, McClelland, Maier & Neustadt, P.C.

(57) ABSTRACT

A process for manufacturing composite sheets. The sheets are made of at least one ply of yarn with this ply having at least two materials with different melting points. The ply is introduced continuously into a zone where it is heated to a temperature between the two melting points and below the degradation temperature of the material having the lower melting point. This ply is then passed over at least one rotating bar heated to a temperature lying between the melting points and below the degradation temperature of the material with the lower melting point. The ply is then compressed on leaving the rotating bar and is cooled to form a composite web. The web is collected in the form of one or more composite plies.

17 Claims, 3 Drawing Sheets

METHOD AND DEVICE FOR MAKING COMPOSITE SHEETS

BACKGROUND OF THE INVENTION

1. Field of the Invention

The present invention relates to a process and an apparatus for implementing the said process for manufacturing composite sheets. It also relates to the composite products obtained.

2. Discussion of the Background

It is already known to manufacture composite sheets, in the form of panels or curved components, from fabrics formed both from reinforcing yarns and from thermoplastic yarns, by stacking the fabrics and then hot-pressing the stack thus formed, as described in Certificate of Utility FR 2,500, 360. Such a process has, in particular, the disadvantage of being a batch process.

Moreover, the patent application filed in France under the filing number 96/00578 describes the manufacture of composite sheets from glass/organic material fabrics which are deposited continuously on a conveyor and then preheated in a hot-air oven before being introduced into a "belt press" (of the type described in Patent U.S. Pat. No. 4,277,539) where they are successively heated and cooled, while at the same time being compressed. Such a process is quick and can be used to obtain sheets suitable for moulding and having good mechanical properties.

However, on some of these sheets, defects are observed in the alignment of the glass filaments (presence of corrugations) in the longitudinal direction (direction of advance of the conveyor) or in the transverse direction, these defects being due to poor reorganization of the yarns after the preheating step and to the transverse shrinkage of the fabrics after this same step. These defects, which in many applications are not of great significance, may nevertheless not be desirable in certain very specific applications (especially in the manufacture of large flat thermoformed articles such as materials-handling boards, food trays, etc., where the filament alignment defects may be the cause of deformations within the articles).

SUMMARY OF THE INVENTION

The object of the present invention is to provide an improved process and an improved apparatus for the manufacture of composite sheets, this process and this apparatus not having the drawbacks of the aforementioned existing processes and apparatuses and making it possible to obtain sheets suitable, in particular, for the manufacture of flat articles with improved characteristics by thermoforming.

This object is achieved by virtue of the process according to the invention, which comprises at least the following steps:

- at least one ply of yarns, this ply comprising at least two materials having different melting points, is introduced continuously into a zone where it is heated to a temperature lying between the said melting points and below the degradation temperature of the material having the lower melting point,
- the ply is passed over at least one rotating bar heated to a temperature lying between the said melting points and below the degradation temperature of the material having the lower melting point,
- the ply is compressed on leaving the bar or bars and is cooled so as to form a composite web,
- the web is collected in the form of one or more composite sheets.

The term "sheet" is understood to mean, according to the present invention, an element which is not very thick compared with its area and is generally flat (but which could possibly be curved) and rigid but has, if need be, sufficient flexibility to be able to be collected and stored in reeled form. In general, it is a solid element but, in some cases, it may be apertured (thus, according to the invention, the term "sheet" also covers, by extension, structures of the mesh type).

The ply of yarns is formed from yarns of at least two materials having different melting points. These two materials may, for example, be thermoplastic organic materials but, preferably, they are a thermoplastic organic material and a material for reinforcing this thermoplastic organic material (for example, glass, carbon, aramid, etc.). In general and preferably, the ply consists of a reinforcing material (advantageously glass) and of one or optionally several thermoplastic organic material(s). The ply generally comprises between 20 and 90% by weight of reinforcing material, (preferably glass), preferably between 30 and 85% by weight of reinforcing material and particularly preferably between 40 and 80% by weight of reinforcing material. It may partly comprise yarns consisting of one of the materials and partly yarns consisting of the other material, these yarns being arranged alternately in the ply and being preferably intimately mixed. It may also comprise compound yarns obtained by combining and simultaneously winding yarns of one of the materials with yarns of the other material, it also being possible for these compound yarns to be mixed with yarns of one of the materials and/or with yarns of the other material.

Preferably, the ply of yarns comprises at least 50% (advantageously at least 80% and particularly preferably 100%) by weight of comingled yarns, i.e. yarns composed of filaments of one of the materials and of filaments of the other material, the filaments being mixed within the yarns (advantageously in an approximately homogeneous manner), these yarns generally being obtained by assembling the filaments directly during manufacture of the said filaments (according to the processes described, for example, in Patent Applications EP-A-0,590,695 and EP-A-0,616,055). The use of plies having at least 50% and preferably at least 80% by weight of comingled yarns makes it possible, in particular, to obtain more homogeneous composites having good mechanical properties, the composite sheets being furthermore produced in a short time and advantageously at a lower pressure.

Preferably, these comingled yarns consist of glass filaments and filaments of thermoplastic organic material, these filaments being intimately mixed.

In many cases, the ply of yarns is in the form of a network or number of networks of interlaced yarns and is preferably in the form of fabrics (generally a web of fabric(s)). The same yarns or combinations of yarns may be used to form the warp and weft of the fabric or network, or the weft and the warp may consist of different yarns or of different combinations of yarns. Thus, the ply of yarns may, for example, be in the form of fabric(s) whose warp consists of organic material/reinforcing material comingled yarns and whose weft consists of 80 to 100% of yarns of organic material of the same kind as that of the comingled yarns. The sheet obtained may then have a preferred direction of orientation of the reinforcing yarns unidirectional sheet). In particular embodiments of unidirectional sheets, the ply of yarns may also advantageously be in the form of bundles of parallel yarns which are touching or slightly placed apart (the spacing between the yarns preferably being less than 2 mm), these yarns preferably being, in this embodiment, comingled yarns.

According to a preferred embodiment of the present invention, the ply comprises a combination of approximately parallel continuous yarns which are oriented in the direction of movement of the ply during the process (longitudinal direction) and, particularly preferably, also comprises a second combination of approximately parallel yarns oriented transversely to this direction and interlaced (preferably woven) with the yarns of the first combination.

In the process according to the invention, the ply of yarns is usually unwound from a support or from several supports (as appropriate, when parallel yarns are involved) on which the ply is wound.

The ply of yarns (moving at a speed of, for example, between 0.5 and 5 m/min) passes through at least one zone where it is heated to a temperature lying between the melting points of the materials making up the ply, this temperature also being below the degradation temperature of the material having the lower melting point. By extension, in the present invention, "degradation temperature" denotes the minimum temperature at which decomposition of the molecules making up the material is observed (as conventionally defined and understood by those skilled in the art) or at which an undesirable alteration of the material is observed, such as ignition of the material, loss of integrity of the material (manifesting itself by flow of material out of the ply) or undesirable colouration of the material (for example, yellowing). This degradation temperature may be conventionally measured by thermogravimetric analysis and/or by noting the minimum temperature at which one of the effects mentioned above occurs.

In the present invention, the ply of yarns is heated sufficiently to allow bonding of at least part of the yarns to each other, by means of the material having the Lower melting point, after compression and, in most cases (except where a mesh-type structure is desired), to produce a solid or approximately solid structure, i.e. preferably having a volume void content of less than 5%. In the case of a glass/organic material composite sheet, the volume void content $V_v$ is calculated from the mass glass content $M_f$ measured by loss on ignition, from the density $\rho_f$ of the glass fibre (equal to 2.6 g/cm$^3$), from the density $\rho_m$ of the organic material and from the density $\rho$ of the composite according to the formula:

$$V_v = 1 - \rho[M_f/\rho_f + (1-M_f)/\rho_m].$$

By way of example, the heating temperature may be about 190 to 230° C. when the ply of yarns consists of glass and polypropylene, it may be about 280 to 310° C. when the ply consists of glass and polyethylene terephthalate (PET) and it may be about 270 to 280–290° C. when the ply consists of glass and polybutylene terephthalate (PBT).

Preferably, the material having the lower melting point has a melting point at least 40° C. and preferably at least 50° C. below the melting point of the material having the higher melting point so as to guarantee preservation of a supporting structure (or of a sufficiently rigid structure) within the ply of yarns during the manufacturing process.

In order to carry out the heating, at least one oven or irradiation device, preferably at least one infrared radiation device (for example, in the form of an oven or of infrared panel(s) or lamp(s), etc.) and/or at least one device in which hot air is blown (for example, a forced-convection hot-air oven), is Generally and preferably used.

In a second, important, step of the process according to the invention, the ply of yarns passes over at least one heated "rotating" bar (rotating about an axis passing through the bar in the direction of its length), it being possible for this bar optionally to be located in the aforementioned heating zone but generally being located at the exit or downstream of the said heating zone. The ply is then already in the heated state, advantageously and preferably in the "partially" molten state, that is to say that one of its constituents is in a molten or optionally softened form. The rotating bar is heated to a temperature which may be close to or different from (by a few degrees or tens of degrees, for example by about 30° C.) that of the aforementioned heating zone and is preferably heated to a temperature greater than or equal to that of the said heating zone.

The use of this bar has several advantages: this bar makes it possible, when required, to feed the ply of yarns at a chosen angle with respect to the compression device (this device generally being in the form of at least one two-roll calender) which lies downstream of the bar, so as, in particular, to avoid excessive contact, before compression, between the ply and the compression device when this device is cooled; the heated rotating bar also makes it possible, if required, to reorganize the yarns within the ply and makes it possible to eliminate much or most of the corrugations usually observed after the material having the lower melting point has melted, while at the same time preventing molten material from being deposited and building up on the bar, these advantages not being jointly obtained if only a rotating bar or only a heated bar is used. The build-up of molten material on the bar is to be avoided as this material ends up being redeposited on the ply and causing irregularities within the composite sheet obtained. The use of the bar also makes it possible to improve the compactness and surface finish of the sheet obtained.

The bar is preferably cylindrical or approximately cylindrical, or has a circular or approximately circular cross-section, which cross-section may or may not vary. Advantageously, it has a small diameter (especially compared with a calender roll), the diameter of this bar furthermore being generally small compared with its length (the length-to-diameter ratio generally Being greater than 20 for this bar, compared with, for example, a calender roll for which the length-to-diameter value rarely exceeds 15). The bar generally has a diameter of between 1 and 10 cm and preferably a diameter of 2.5 to 6 cm and is coated with a coating which is advantageously heat-resistant and non-stick; it is, for example, made of steel coated with polytetrafluoroethylene (PTFE). Advantageously, it may have one or more helicoidal grooves or a relief in the form of opposed helices, which help to smooth out the ply of yarns, and may, optionally, be slightly curved.

The peripheral speed of rotation of the bar may be greater than or equal to the speed of movement of the ply within the manufacturing plant (for example, about 0.5 to 10 m/min and, Preferably, from 0.5 to 5 m/min for a speed of movement of the ply of 0.1 to 2.5 m/min), especially when the bar has a diameter of about 1 to 4 cm, or may be less than or equal to the speed of movement of the ply (for example, about 0.25 to 2.2 m/min for a speed of movement of the ply of 0.5 to 2.5 m/min), especially when the bar has a diameter greater than 4 cm. The bar may be rotated in the same direction as the direction of advance of the ply, especially when the bar has a diameter greater than 4 cm, or may be rotated in the opposite direction thereto.

Generally, a single bar is necessary and sufficient for implementing the process according to the invention. However, especially when the ply has sizeable corrugations, it is possible to use two heated rotating bars (or indeed more than two bars) according to the invention, the yarns then passing in succession over each of the bars (i.e. over one and then over the other), these bars generally being placed one after the other.

Preferably, according to the invention, the ply of glass yarns comes into contact with at least one heated rotating bar (or optionally with each heated rotating bar when there are several of them) over a portion of the bar (over a circular arc) delimited (or subtended) by an angle at the centre of between 45 and 200° (that is to say that the ply passes over part of the circumference of the bar, this part representing from 12.5 to 55.5% of the said circumference) so as, in particular, significantly to reorganize the filaments within the ply.

After passing over the bar or bars, the heated ply of yarns is compressed using a compression device, for example using at least one two-roll calender. The force exerted on the ply during its passage through the compression device, for example during its simultaneous passage between two rolls of a calender, is generally several kgf/cm, or even several tens of kgf/cm (on this matter, it should be noted that the aforementioned rotating bar(s), contrary to calender rolls, neither allows (allow) nor intends (intend) the ply to be compressed, the sole force exerted at each bar being due to the tension of the ply and generally not exceeding 0.5 kgf/cm.

The pressure exerted in the compression device compacts the ply of yarns, the structure obtained being fixed by cooling, it being possible for this cooling to be carried out, at least partly, simultaneously with the compression or for it also to be carried out after a hot-compression step.

The compression device may comprise at least one calender, especially a calender maintained at a temperature below the solidification point of the material having the lower melting point (the calender is, for example, at a temperature of between 20 and 150° C.) so as to solidify it.

The compression device may also comprise several calenders, especially in the case of large thicknesses and if excellent flatness and/or high production rates are desired. Moreover, especially if materials having high melting points or having a high crystallization rate (for example, polyester) are used and if solid or approximately solid sheets are sought, it may be desirable to heat the calender (or at least the first calender) of the compression device downstream of the bar(s) to a temperature of above 75° C. and preferably above 100° C. or even above 150° C. In this case, the rolls of the heated calender are preferably coated with, for example, a PTFE-based non-stick coating and/or a release film (made of siliconized paper or of PTFE-coated glass cloth, for example) runs between each roll and the ply of yarns (optionally, this film may be in the form of an endless web).

According to one embodiment of the invention, the compression device may also comprise or consist of a belt press (provided, for example, with belts made of steel or of glass cloth or of aramid cloth, the cloth preferably being coated with PTFE) comprising a hot zone (especially with one or more calenders) followed by a cold zone (with cooling elements in the form of bars, plates, etc. and optionally one or more calenders).

In order to increase the rate at which it cools, on leaving the compression device the composite web produced may pass over a cooling table through which cooled water flows, this table possibly being slightly convex to provide greater contact with the web. In order to further improve the cooling and/or contact, the table may be combined with pressure rolls, these being preferably cooled (for example by circulation of water) and/or having one or more cooled plates, applied freely or pressed, and/or having one or more nozzles for blowing air, and/or the web may be pulled by forwarding rollers located, for example, downstream of the table.

The composite web, after compression and cooling, may be wound onto a mandrel, the diameter of which depends on the thickness of the web, (the sheet formed then corresponds to the wound web) or may be cut by a cutting device (guillotine or circular-saw device, for example) so as to form several sheets.

The process according to the invention has several variants. It is possible, in particular, to combine several plies of yarns so as to form sheets of greater thickness. Thus, according to one embodiment of the invention:

- a first ply of yarns, this ply comprising at least two materials having different melting points, is introduced continuously into a first zone where it is heated to a temperature lying between the said melting points and below the degradation temperature of that material of this first ply which has the lower melting point,
- a second ply of yarns, this ply comprising at least two materials having different melting points, is simultaneously introduced continuously into a zone (generally a second zone) where it is heated to a temperature lying between the said melting points and below the degradation temperature of that material of this second ply which has the lower melting point,
- the first ply is passed over a first rotating bar or series of rotating bars heated to a temperature lying between the melting points of the materials of the first ply and below the degradation temperature of that material which has the lower melting point,
- the second ply is passed simultaneously over a second rotating bar or series of rotating bars heated to a temperature lying between the melting points of the materials of the second ply and below the degradation temperature of that material which has the lower melting point,
- the two plies, which are simultaneously compressed on leaving at least one of the bars or series of bars, are joined together and cooled so as to form a composite web,
- the web is collected in the form of one or more composite sheets.

This embodiment makes it possible to obtain sheets of greater thickness. In the same way, depending on the thickness of the sheet that it is desired to obtain, it is possible to combine several plies of yarns, each ply passing through a heating zone and then over a bar or series of bars, and the plies being joined together in one or more steps downstream of one or more bars or series of bars before the combination is compressed. It is possible, in particular, to bind the first plies together, for example in pairs, downstream of their respective bars, the final operation of joining the combination of plies together taking place downstream of the bar or bars through which the final ply or the final pair or combination of plies has passed, one or more of the combined plies optionally being compressed and/or reheated before the final combining operation. Such an embodiment is illustrated below, especially in FIG. 2.

It is also possible, before the combination is compressed, to unwind one or more surface films onto one or both sides of the ply or of the combined plies, these films adhering, hot, to the ply (plies). These films may be made of material(s) identical to or different from those (or one of those) of the plies of yarns (they may be metallic, organic, etc.), these films preferably having a coating of a nature similar to the nature of the material having the lower melting point present in the ply (plies).

More generally, one or more sheets or networks or other plane structures, (for example yarns or wires, meshes, fabrics, cellular structures or structures containing elements in powder form or liquid form, sheets or panels or films, essentially of a metallic, polymeric or inorganic nature, or made of wood, etc) may be placed on the surface of the ply (plies) and/or introduced between several plies, continuously or in a batch process, these being separate from the plies and giving the composite sheets obtained special properties (additional reinforcement by yarns or wires of a different nature, improved mechanical properties, protection against electromagnetic radiation, improved thermal or accoustic insulation, lighter composite structures, improved mouldability, surface appearance, etc.).

The present invention also relates to an apparatus for implementing the process. This apparatus comprises:
a) one or more devices (or means) for feeding at least one ply of yarns,
b) at least one device (or means) for heating the ply,
c) at least one heated rotating bar along the path of the ply,
d) and at least one device (or means) for compressing and, optionally, cooling the ply.

Advantageously, according to the invention, the aforementioned means a, b, c and d are separate means, the apparatus according to the invention thus comprising at least four different means, each fulfilling a particular role.

The apparatus according to the invention may also comprise at least one cutting device and/or at least one device for collecting the composite sheets. It may also comprise at least one device for cooling the ply separate from the compression device d.

The composite sheets obtained by combining the steps of the process according to the invention comprise filaments of a material having a higher melting point (generally, reinforcing filaments) embedded in the sheet and generally arranged, in the case of at least part of them, in the direction of advance of the sheet during its manufacture and preferably also, in the case of the other part (or at least one other part of these filaments), in the direction transverse to the direction of advance. The sheet thus comprises at least one combination of filaments of material having a higher melting point which are arranged so as to be approximately parallel to a first direction and optionally at least a second combination of filaments of a material having a higher melting point which are arranged so as to be approximately parallel to a second direction which is preferably transverse to the first, all these filaments being embedded in the material having the lower melting point and the amplitude of any corrugations (or deviations) of each filament with respect to its direction being less than 0.5 mm (it being possible for the amplitude of the corrugations to be as much as 2 to 6 mm in conventional processes for obtaining composite sheets). Moreover, the solid sheets obtained according to the invention have a void content of less than 5%.

BRIEF DESCRIPTION OF THE DRAWINGS

Other advantages and characteristics of the invention will appear in the light of the following drawings illustrating the invention without, however, limiting it, in which drawings.

DISCUSSION OF THE PREFERRED EMBODIMENT

Figure 1:
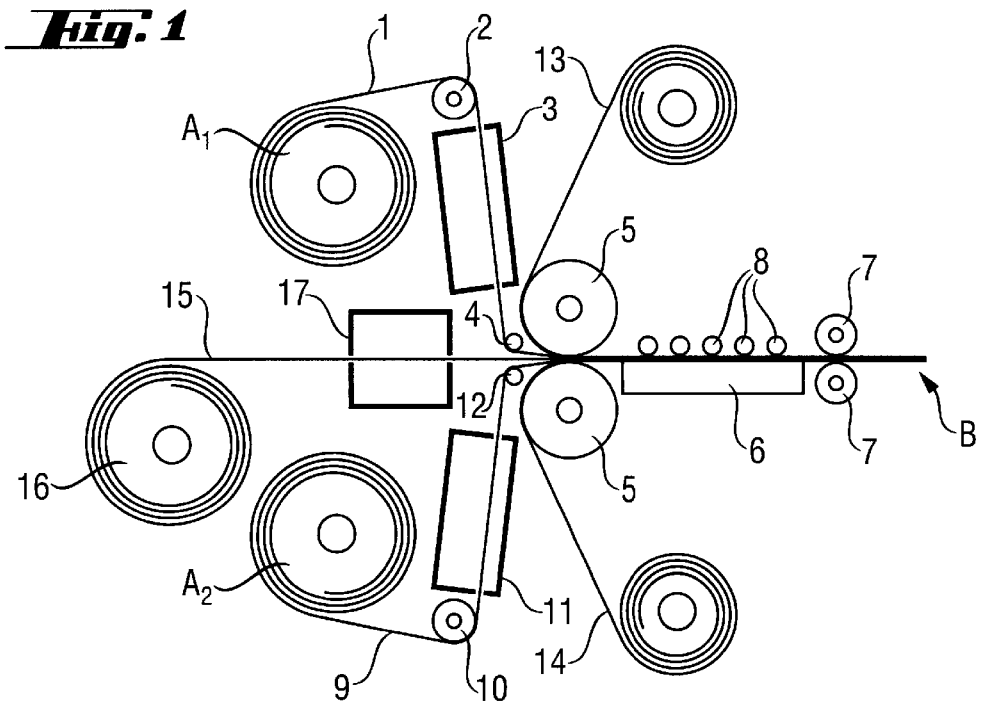
FIG. 1 represents a diagrammatic view of an apparatus allowing the invention to be implemented in a first way.

In the embodiment illustrated in FIG. 1, a fabric 1 of comingled glass/polypropylene yarns is unwound from a feed device (pay-out) $A_1$. This fabric passes over a turn roll 2 having a diameter of between 10 and 20 cm and then enters an infrared radiation oven 3 in which the polypropylene filaments within the fabric are melted. Next, the fabric passes in the partially molten state over a PTFE-coated steel bar 4 having a diameter of 1 to 5 cm, this bar being heated above the melting point of polypropylene and rotating in the opposite direction to the direction of advance of the fabric, with an adjustable speed of rotation.

The fabric, thus smoothed out both by the bar and by the tension (especially the pay-out tension) exerted on the fabric and having well-aligned glass filaments, then passes through a two-roll calender 5, the rolls having a diameter of 20 to 80 cm and each being maintained at a temperature below the solidification point of polypropylene, and emerges as a composite web B which is cooled on a cooling table 6. In order to improve contact between the web and the cooling table, the web is pulled by forwarding rolls 7 and pressed against the table by means of cooled pressure rolls 8.

Next, the web is wound up on a mandrel (not illustrated) or cut in the form of sheets by a device, for example a circular-saw device, placed on a follower carriage.

In this embodiment of the invention, it is also possible to unwind another fabric 9 of comingled glass/polypropylene yarns from a second feed device $A_2$, the two feed devices being arranged vertically and on either side of the manufacturing line (feeding the fabrics vertically prevents them from sagging after they have been heated). The second fabric, after passing over a turn roll 10, enters another infrared radiation oven 11 and then passes over another PTFE coated steel bar 12 heated approximately to the same temperature as that of the first bar mentioned. Next, the fabrics 1 and 9 are compressed simultaneously by the calender 5 and then form a web of greater thickness than if a single fabric is used.

It is also possible in this embodiment to bond, by melting, one or two surface films 13 and/or 14 to one or both sides of the web.

It is also possible to obtain thicker sheets by introducing a sheet 15 (for example of the same type) which is unwound under controlled tension from a pay-out 16, between the two fabrics 1 and 9. The surfaces of the sheet 15 are preheated by the oven 17 so as to ensure that the sheet/fabrics combination is compacted to a maximum extent in the calender 5.

Figure 2:
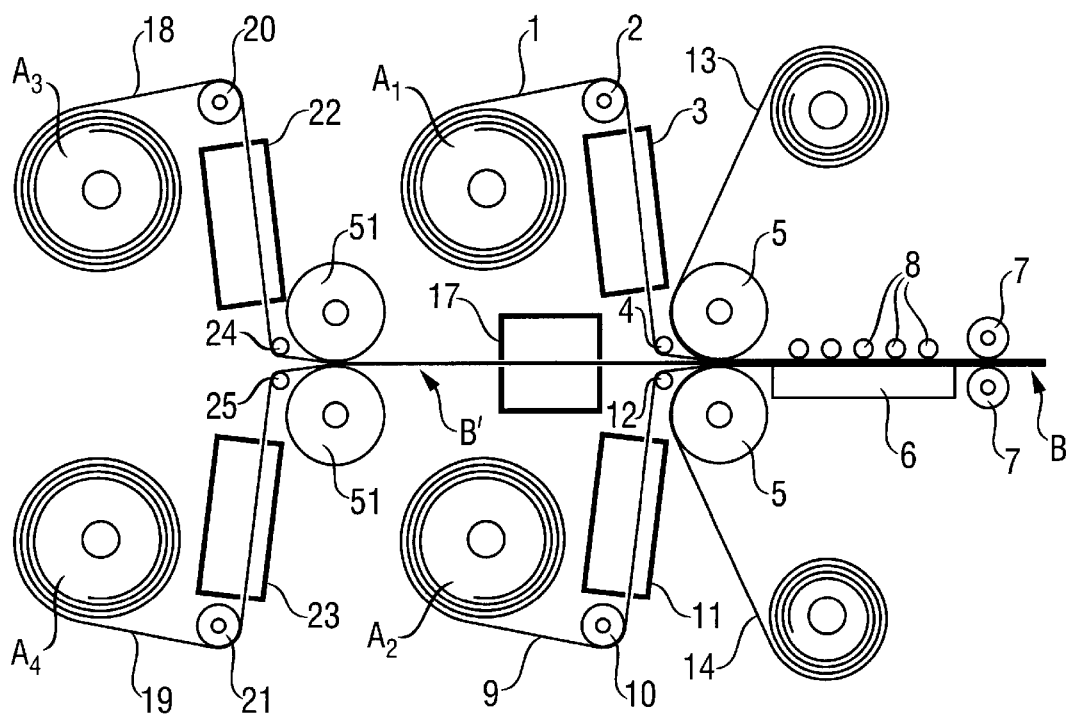
FIG. 2 represents a diagrammatic view of an apparatus allowing the invention to be implemented in a second way.

In the embodiment illustrated in FIG. 2, the aforementioned sheet which is introduced between the two fabrics is replaced by a first web B' of fabrics obtained by assembling two other fabrics, each fabric 18, 19, having been unwound from a feed device $A_3$, $A_4$, passed over a turn roll 20, 21, then passed through an infrared radiation oven 22, 23 and then passed over a bar 24, 25 similar to the two bars described previously, the two fabrics then having been compressed simultaneously by a calender 51 so as to form the first aforementioned web of fabrics. Such an embodiment uses, as it were, two melting/calendering modules.

Figure 3:
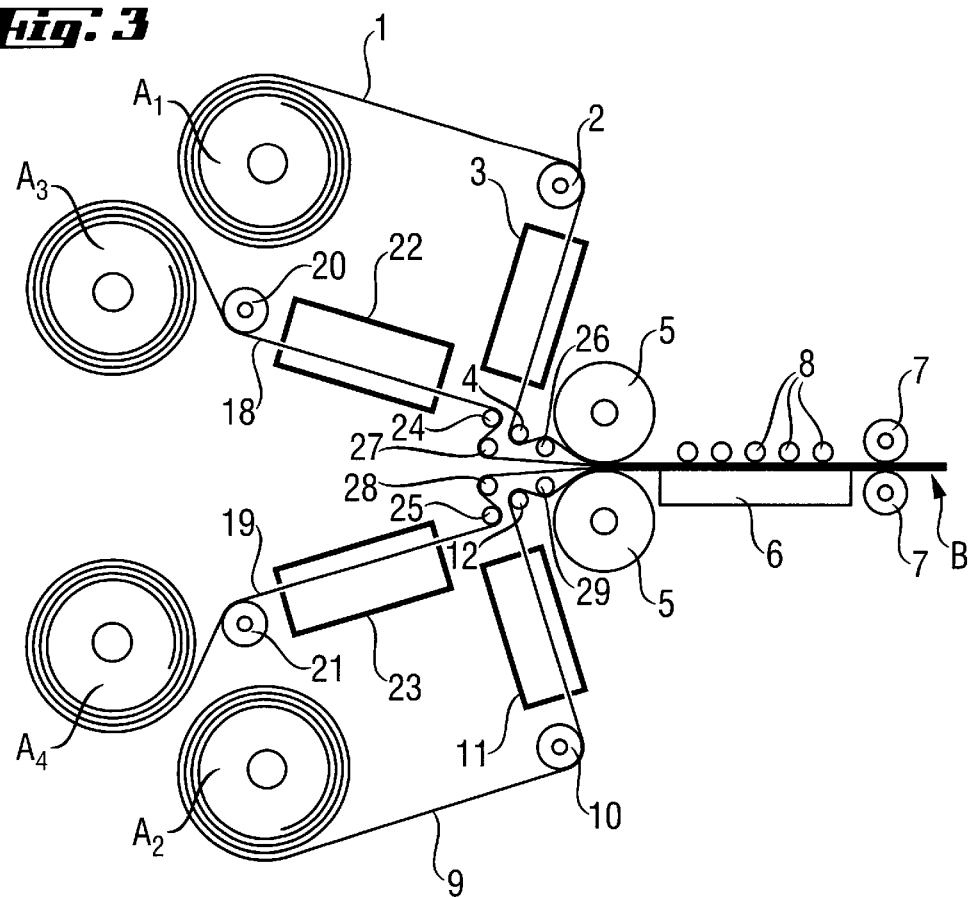
FIG. 3 represents a diagrammatic view of an apparatus allowing the invention to be implemented in a third way.

In the embodiment illustrated in FIG. 3, the following modifications are made with respect to the embodiment shown in FIG. 2: the four fabrics 1, 9, 18, 19 are assembled directly at the calender 5 where they are simultaneously compressed, each fabric coming from a pay-out and having been preheated in an infrared radiation oven. Before being compressed in the calender, each fabric passes in succession over two similar heated rotating bars (4, 12, 24, 25, 26, 27, 28, 29) so as to be smoothed out more effectively, these bars furthermore feeding the fabrics into the calender 5 at a chosen angle and allowing all the fabrics to be directly combined in the calender.

Figure 4:
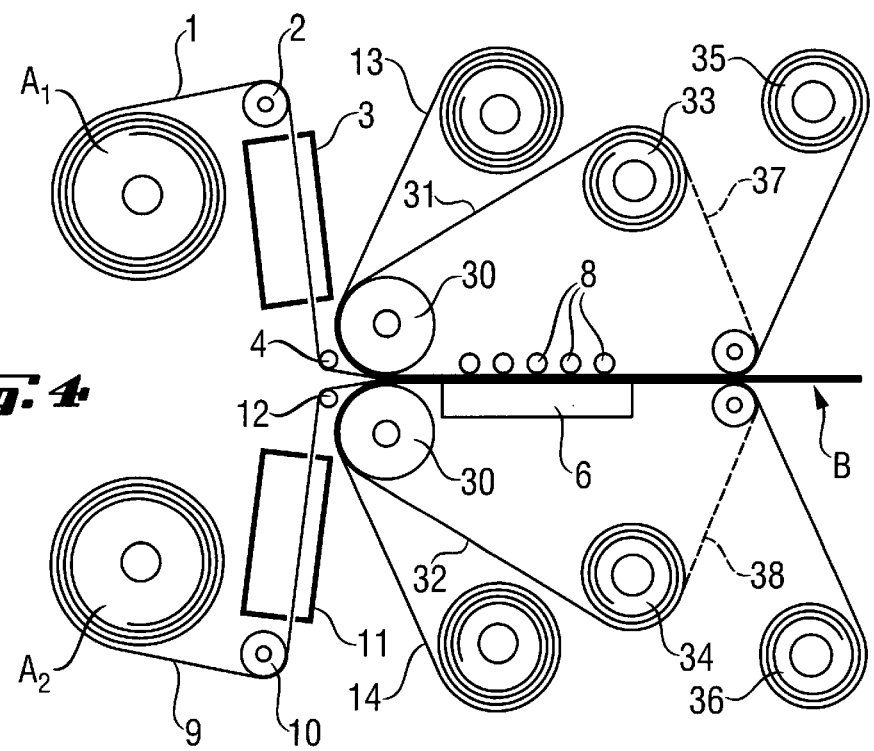
FIG. 4 represents a diagrammatic view of an apparatus allowing the invention to be implemented in a fourth way.

In the embodiment shown in FIG. 4, a similar apparatus to that illustrated in FIG. 1 is used to manufacture sheets from fabrics of comingled glass/polyethylene terephthalate (PET) yarns. In this embodiment, the calender 30 is heated this time, the rolls of the calender being coated with PTFE.

If the polymer still sticks to the rolls of the calender 30, it may be useful to unwind at the same tire two release films 31 and 32 made of siliconized paper or of PTFE-coated glass cloth, for example. These films come from pay-outs 33 and 34, respectively, and are wound Up on the rotating supports 35 and 36, respectively. This configuration does not prevent the surface films 13 and 14 from being laminated. Instead of co glass/PTFE release films, two endless webs 37 and 38 of the same kind (or made of aramid/PTFE or made of metal) may be preferred.

In the case of large thicknesses, and if excellent flatness is required, it may be advantageous to replace the cooling table 6 with several two-roll calenders. Thus, in the embodiment illustrated in FIG. 5, the cooling table of the apparatus illustrated in FIG. 3 is replaced with two calenders 39 and 40.

If it is necessary to heat the first calender 5, two release webs 41 and 42 may also be installed, these optionally also passing between the additional calenders.

Figure 5:
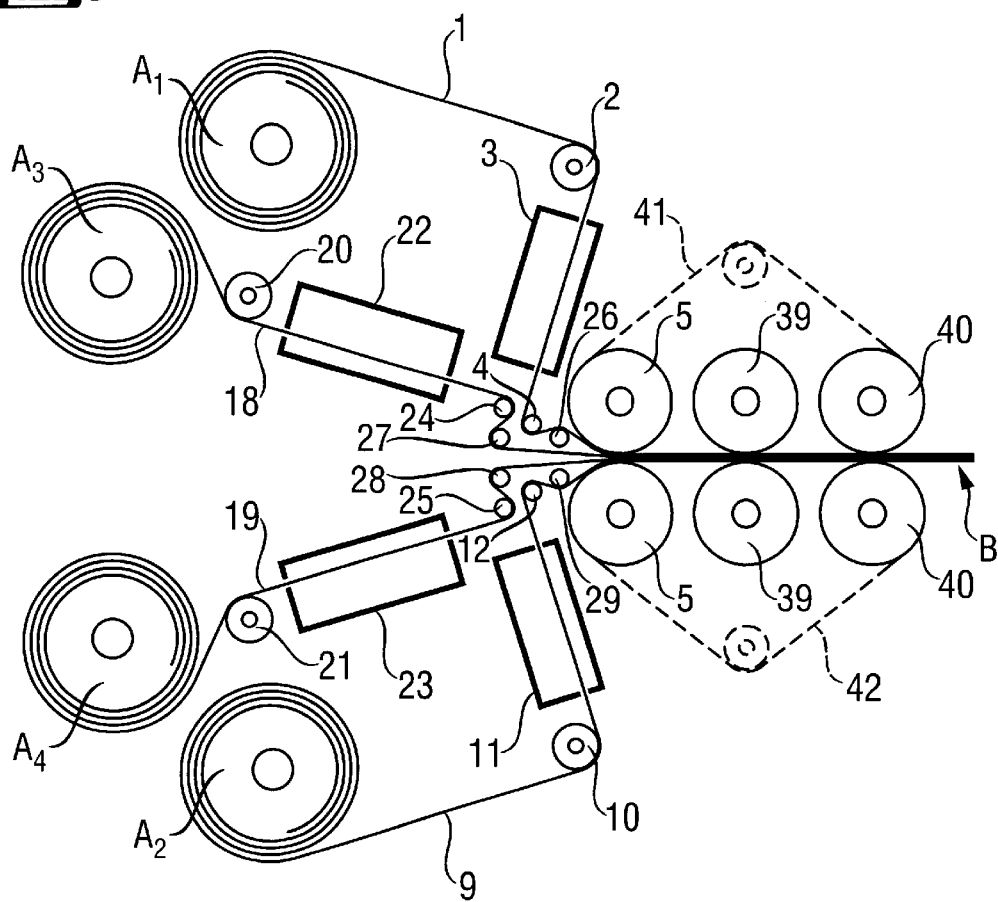
FIG. 5 represents a diagrammatic view of an apparatus allowing the invention to be implemented in a fifth way.
Figure 6:
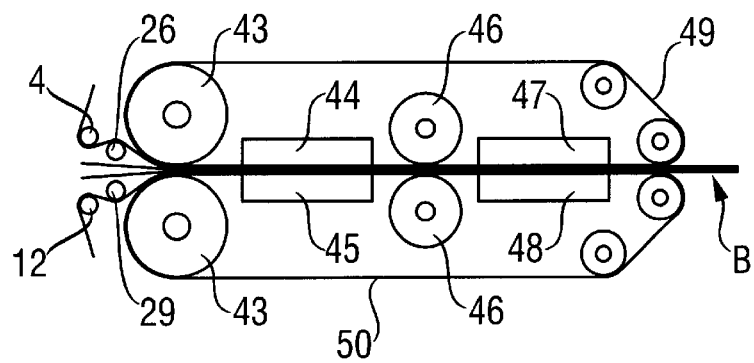
FIG. 6 represents a diagrammatic view of part of an apparatus for implementing the invention.

It is also possible to replace the calender or calenders and, if required, the cooling table with a belt press such as that shown in FIG. 6 (the apparatus upstream of the rotating bars, for example similar to that in FIG. 5, not being shown), this press comprising a hot zone (rolls 43, plates 44 and 45 and, optionally, a calender 46), a cold zone (optionally, the calender 46 and the plates 47 and 48) and belts 49, 50 made, for example, of PTFE-coated glass cloth (or aramid cloth).

The following examples illustrate, non-exhaustively, the process according to the invention as well as the products obtained according to this process.

EXAMPLE 1

In order to manufacture a sheet 1.3 m in width and 1 mm in thickness, consisting of 60% by weight of glass and 40% of polypropylene coloured black throughout its mass, a single-calender plant such as that described with the aid of FIG. 1 (without the elements 13 to 17) is used.

Two 710 g/m$^2$ fabrics formed from yarns of 790 tex comingled rovings containing 60% glass and 40% polypropylene by weight are heated in respective ovens which have a similar power of about 14 kW. The surface temperature of the fabrics is approximately 190° C. The smoothing bars, 32 mm in diameter, are heated to 230° C. and rotate at a speed of revolutions per minute (0.7 m/min) in the opposite direction to the advance of the fabrics.

The calender, at 40° C. and comprising two rolls each 300 mm in diameter, presses on the fabrics with a force of 2600 daN/m.

The sheet leaves continuously at a speed of 1.3 m/min. This sheet may be wound up onto a mandrel having a diameter of at least 160 mm.

The volume void content of the sheet obtained is less than 5%, thereby making this sheet suitable for thermoforming using a cold mould or a mould which is heated (for example to 80° C.) with cycle times of less than one minute.

EXAMPLE 2

In order to manufacture sheets 1.3 m in width and 2 mm in thickness, consisting of 60% by weight of glass and 40% of polypropylene coloured black throughout its mass, the plant of Example 1, provided with a third pay-out from which the sheet obtained in Example 1 is unwound (sheet 15 in FIG. 1), is used.

Two 710 g/m$^2$ fabrics similar to those used in Example 1 are heated in ovens similar to those used in Example 1. The surface temperature of the fabrics is approximately 210° C. The smoothing bars, 32 mm in diameter, are heated to 230° C. and rotate at a speed of 7 revolutions/minute in the opposite direction to the advance of the fabrics.

The core sheet is heated to 130° C. in an oven set to approximately 10 kW.

Two black polypropylene surface films 50 μm in thickness (films 13, 14 in FIG. 1) are hot bonded to the faces of the web obtained by combining the fabrics with the core sheet.

The calender, at 65° C. and comprising two rolls each 300 mm in diameter, presses on this web with a force of 2600 daN/m.

The web formed from four fabrics and two black films leaves continously at a speed of 1.2 m/min. It is cut transversely in order to give sheets 2 m in length.

The volume void content of each sheet obtained is less than 5%.

EXAMPLE 3

In order to manufacture sheets 1.5 m in width and 1 mm in thickness, consisting of 75% of glass and 25% of natural-coloured polypropylene by weight, the plant of Example 1, provided with a third pay-out from which a 0.4 mm sheet containing 75% glass and 25% polypropylene is unwound, is used.

Two 560 g/m$^2$ fabrics composed of yarns of 690 tex comingled rovings containing 75% glass and 25% polypropylene are heated in ovens similar to those in Example 1. The surface temperature of the fabrics is approximately 220° C. The smoothing bars, approximately 30 mm in diameter, are heated to 230° C. and rotate at a speed of 7 revolutions/min in the opposite direction to the advance of the fabrics.

The core sheet is heated to 130° C. in an oven set to approximately 10 kW.

The calender, at 34° C. and comprising two rolls each 300 mm in diameter, presses on the assembly with a force of 3600 daN/m.

The web formed by the three elements leaves continuously at a speed of 1.2 m/min. It is cut into sheets 1.5 m in length.

EXAMPLE 4

In order to manufacture sheets 1.4 m in width and 1 mm in thickness, consisting of 65% glass and 35% natural-coloured PET by weight, the plant of Example 3 is used.

Two 660 g/m$^2$ fabrics composed of yarns of 730 tex comingled rovings containing 65% glass and 35% PET are heated to a temperature of approximately 290° C. The smoothing bars, 32 mm in diameter, are heated to 290° C. and rotate at a speed of 7 revolutions/min in the opposite direction to the advance of the fabrics.

The core sheet, containing 65% glass and 35% PET, is heated to 220° C. in an oven set to approximately 14 kW.

The calender, at 200° C. and consisting of two PTFE-coated rolls 300 mm in diameter, presses on the assembly with a force of about 3850 daN/m.

The web formed by the three fabrics leaves continuously at a speed of 1 m/min. It is cut into sheets 2.5 m in length.

EXAMPLE 5

In order to manufacture sheets 1.4 m in width and 1 mm in thickness, consisting of 65% glass and 35% natural-coloured PBT by weight, the plant of Example 3 is used.

Two 660 g/m² fabrics composed of yarns of 730 tex comingled rovings containing 65% glass and 35% PBT are heated to a temperature of approximately 280° C. The smoothing bars, 50 mm in diameter, are heated to 290° C. and rotate at a speed of 0.9 m/min in the direction of advance of the fabrics.

The core sheet, containing 65% glass and 356 PBT, is heated to approximately 210° C. in an oven set to approximately 12 kW.

The calender, at 120–140° C. and comprising two steel rolls 300 mm in diameter, presses on the assembly with a force of about 3850 daN/m.

The web formed by the three fabrics leaves continuously at a speed of 1 m/min. It is wound up on a mandrel 300 mm in diameter.

The sheets formed according to the process of the invention are particularly suitable for the production of articles by thermoforming, especially of large flat articles or of casings or shrouds for protecting machines, etc.

What is claimed is:

1. Process for manufacturing composite sheets, said process comprising the steps of:
   providing at least a first ply of yarns, wherein said first ply includes at least two materials having different melting points;
   continuously introducing said at least first ply into a zone heated at a temperature lying between said melting points and below the degradation temperature of the material having the lower melting point;
   passing said at least first ply over at least a first rotating bar heated to a temperature lying between said melting points and below said degradation temperature;
   compressing said at least first ply after it is passed over said at least first rotating bar and cooling said first ply in order to form a composite web; and
   collecting said composite web in a form of at least one composite sheet.

2. Process according to claim 1, wherein said providing said at least first ply includes providing at least 50% by weight of co-mingled yarns.

3. Process according to claim 2, wherein said providing said at least 50% by weight of co-mingled yarns includes providing mainly glass filaments and filaments of thermoplastic organic material, said glass filaments and said filaments of thermoplastic organic material being intimately mixed.

4. Process according to claim 1, wherein said providing said at least first ply is in a form of at least one fabric.

5. Process according to claim 1, further comprising:
   providing at least a second ply of yarns, wherein said at least second ply includes at least two materials having different melting points;
   continuously introducing said at least second ply into a zone heated at a temperature lying between said melting points of said at least second ply and below the degradation temperature of the material of said at least second ply having the lower melting point;
   passing said at least second ply over at least a second rotating bar heated to a temperature lying between said melting points of said at least second ply and below said degradation temperature of said at least second ply;
   joining said at least first ply and said at least second ply together, simultaneously by compressing said plies, and cooling said plies in order to form a composite web; and
   collecting said composite web in a form of at least one composite sheet.

6. Process according to claim 1, wherein said providing of said at least one ply includes providing any combination of several fabrics, plies of yarns, meshes, cellular structures, sheets, and films which may be joined together and compressed simultaneously downstream of said at least first rotating bar.

7. Apparatus for manufacturing at least one composite sheet, said apparatus comprising, in the following order:
   at least one feed device for feeding at least one ply of yarns made up of at least two materials having different melting points;
   at least one heating device for heating said at least one ply;
   at least one rotating bar located along a path of travel of said at least one ply; and
   optionally, a cooling device for cooling the at least one composite sheet.

8. Composite sheet based on at least one thermoplastic organic material and at least one reinforcing material, comprising at least one combination of reinforcing filaments which are arranged so as to be approximately parallel to a first direction, these filaments being embedded in the organic material and the amplitude of the corrugations of each filament with respect to its direction being less than 0.5 mm.

9. Process according to claim 2, wherein said providing said at least first ply is in a form of at least one fabric.

10. Process according to claim 3, wherein said providing said at least first ply is in a form of at least one fabric.

11. Process according to claim 2, further comprising:
   providing at least a second ply of yarns, wherein said at least second ply includes at least two materials having different melting points;
   continuously introducing said at least second ply into a zone heated at a temperature lying between said melting points of said at least second ply and below the degradation temperature of the material of said at least second ply having the lower melting point;
   passing said at least second ply over at least a second rotating bar heated to a temperature lying between said melting points of said at least second ply and below said degradation temperature;
   joining said at least first ply and said at least second ply together, simultaneously by compressing said plies, and cooling said plies in order to form a composite web; and collecting said composite web in a form of at least one composite sheet.

12. Process according to claim 3, further comprising:

providing at least a second ply of yarns, wherein said at least second ply includes at least two materials having different melting points;

continuously introducing said at least second ply into a zone heated at a temperature lying between said melting points of said at least second ply and below the degradation temperature of the material of said at least second ply having the lower melting point;

passing said at least second ply over at least a second rotating bar heated to a temperature lying between said melting points of said at least second ply and below said degradation temperature;

joining said at least first ply and said at least second ply together, simultaneously by compressing said plies, and cooling said plies in order to form a composite web;

collecting said composite web in a form of at least one composite sheet.

13. Process according to claim 4, wherein:

providing at least a second ply of yarns, wherein said at least second ply includes at least two materials having different melting points;

continuously introducing said at least second ply into a zone heated at a temperature lying between said melting points of said at least second ply and below the degradation temperature of the material of said at least second ply having the lower melting point;

passing said at least second ply over at least a second rotating bar heated to a temperature lying between said melting points of said at least second ply and below said degradation temperature;

joining said at least first ply and said at least second ply together, simultaneously by compressing said plies, and cooling said plies in order to form a composite web; and collecting said composite web in a form of at least one composite sheet.

14. Process according to claim 2, wherein said providing of said at least one ply includes providing any combination of several fabrics, plies of yarns, meshes, cellular structures, sheets, and films which may be joined together and compressed simultaneously downstream of said at least first rotating bar.

15. Process according to claim 3, wherein said providing of said at least one ply includes providing any combination of several fabrics, plies of yarns, meshes, cellular structures, sheets, and films which may be joined together and compressed simultaneously downstream of said at least first rotating bar.

16. Process according to claim 4, wherein said providing of said at least one ply includes providing any combination of several fabrics, plies of yarns, meshes, cellular structures, sheets, and films which may be joined together and compressed simultaneously downstream of said at least first rotating bar.

17. Process according to claim 5, wherein said providing of said at least of yarns includes providing any combination of several fabrics, plies of yarns, meshes, cellular structures, sheets, and films which may be joined together and compressed simultaneously downstream of said at least first rotating bar.

* * * * *